United States Patent
Tarnutzer et al.

(10) Patent No.: US 9,940,223 B2
(45) Date of Patent: Apr. 10, 2018

(54) HUMAN-MACHINE INTERFACE TEST SYSTEM

(71) Applicants: Stephan A. Tarnutzer, Shelby Township, MI (US); Edward J. Frank, Waterford, MI (US); Brian A. Fischer, Clarkston, MI (US); Guy N. Kennerly, Eastpointe, MI (US); William Osipoff, Sterling Heights, MI (US); Joseph W. Priskorn, Macomb, MI (US)

(72) Inventors: Stephan A. Tarnutzer, Shelby Township, MI (US); Edward J. Frank, Waterford, MI (US); Brian A. Fischer, Clarkston, MI (US); Guy N. Kennerly, Eastpointe, MI (US); William Osipoff, Sterling Heights, MI (US); Joseph W. Priskorn, Macomb, MI (US)

(73) Assignee: FEV North America Inc., Auburn Hills, MI (US)

( * ) Notice: Subject to any disclaimer, the term of this patent is extended or adjusted under 35 U.S.C. 154(b) by 359 days.

(21) Appl. No.: 14/246,498

(22) Filed: Apr. 7, 2014

(65) Prior Publication Data
US 2014/0303756 A1   Oct. 9, 2014

Related U.S. Application Data

(60) Provisional application No. 61/853,452, filed on Apr. 5, 2013, provisional application No. 61/885,711, filed on Oct. 2, 2013.

(51) Int. Cl.
*G05B 15/02* (2006.01)
*G06F 11/36* (2006.01)

(52) U.S. Cl.
CPC .............................. *G06F 11/3688* (2013.01)

(58) Field of Classification Search
CPC .... G06F 11/221; G06F 11/26; G06F 11/2733; G01R 31/31905; G05B 2219/24058
See application file for complete search history.

(56) References Cited

U.S. PATENT DOCUMENTS 6,823,280 B2 * 11/2004 Brayton ................. G05B 19/05
                                                         702/108
6,862,699 B2 *  3/2005 Nakashima ............. H04L 12/56
                                                         714/701

(Continued)

OTHER PUBLICATIONS

Chao, Gong. Human-Machine Interface: Design Principles of Visual Information in Human-Machine Interface Design. 2009 International Conference on Intelligent Human-Machine Systems and Cybernetics. IEEE. 2009.*

(Continued)

*Primary Examiner* — Matthew David
(74) *Attorney, Agent, or Firm* — Gerald R. Black, Esq.

(57) ABSTRACT

The human-machine interface test system enables the automated testing of vehicle interface systems and consumer electronics devices, replacing testing and validation that previously had required human interaction. The human-machine interface device (HMI test object or device under test) does not need to be altered (via hardware or software modifications or additions) to be able to be tested using the human-machine interface test system. The HMIts involves the automated audio input generation and output analysis, visual verification of a display screen with graphics and texts display, including touch and gesture interface control and feedback, external device interface, as well as data logging for communication between the HMI device and the rest of the system, that will replace the testing and validation that previously required human interaction. The HMIts provides more accurate and reliable results from the conducted tests, (Continued)

High-Level Test Strategy

Human-Machine Interface Test System increasing repeatability and consistency in a controlled environment, while significantly decreasing test time.

10 Claims, 3 Drawing Sheets

(56) References Cited

U.S. PATENT DOCUMENTS

| | | | | |
|---|---|---|---|---|
| 6,963,814 B2* | 11/2005 | Jones | ................... | G06F 11/221 |
| | | | | 700/2 |
| 7,773,964 B2* | 8/2010 | Ozaki | ................... | G01R 29/10 |
| | | | | 455/115.1 |
| 8,362,791 B2* | 1/2013 | Ueda | ................ | G01R 31/31905 |
| | | | | 324/754.01 |
| 8,443,381 B2* | 5/2013 | Nagahara | ............ | G06F 11/3668 |
| | | | | 719/320 |
| 8,516,311 B2* | 8/2013 | Fan | ....................... | G06F 11/221 |
| | | | | 714/43 |
| 8,957,972 B2* | 2/2015 | Gluskin | ................. | H04N 17/04 |
| | | | | 348/192 |
| 9,037,448 B2* | 5/2015 | Ito | ......................... | G06F 9/5055 |
| | | | | 703/21 |
| 2006/0053644 A1* | 3/2006 | Currie | .................... | G01C 17/38 |
| | | | | 33/356 |
| 2013/0150984 A1* | 6/2013 | Nigro | ..................... | G05B 11/42 |
| | | | | 700/37 |
| 2014/0278199 A1* | 9/2014 | Rajagopal | ........... | G06F 11/3668 |
| | | | | 702/122 |

OTHER PUBLICATIONS

Texas Instruments. Human Machine Interface (HMI) Guide. 2014.*
Rae, Andrew. Helping the Operator in the Loop: Practical Human Machine Interface Principles for Safe Computer Controlled Systems. Australian Computer Society, Inc. 2007.*

* cited by examiner

Human-Machine Interface Test System

HUMAN-MACHINE INTERFACE TEST SYSTEM

CROSS REFERENCES TO OTHER APPLICATIONS

This application is related to and claims priority to U.S. Provisional Application No. 61/853,452, entitled "Human-Machine Interface Test System" (Tarnutzer et al.), filed: Apr. 5, 2013; and to U.S. Provisional Application No. 61/885,711, entitled "Human-Machine Interface Test System" (Tarnutzer et al.) filed: Oct. 2, 2013

FIELD OF THE INVENTION

The invention relates to a human-machine interface test system (HMIts), and more particularly, a human-machine interface test system which combines multiple technologies, enabling the fully automated testing of a complex human-machine interface.

BACKGROUND OF THE INVENTION

With the prevalence of human machine (vehicle) interface systems, from Ford's current "Sync System" to BMW's current "iDrive System", OEM's have been consolidating many of the vehicle functions, HVAC control, navigation, integrated Bluetooth connectivity for using the driver's cellular phone hands free and/or for replication of the phone's display (applications), to radio control, into one user interface system. This applies not only to radio or so-called head units and centerstack displays but also to clusters or cluster information displays. At present, it is difficult to test the systems and achieve consistent results with there currently being no ability to have the testing fully automated.

- U.S. Pat. No. 7,342,512 (Hedrick) discloses a flat panel display system for an aircraft display which includes a graphics rendering computer for rendering of antialiased graphical imaging data derived from aircraft sensors for full-field imaging on a cockpit display screen. A comparator processor independently generates, from the same sensor data, a selected subset or "points of light" of the display screen image and compares the points-of-light data to the data generated by the rendering computer for the same display screen pixel locations.
- European Publication No. EP2040135 (Bliss) discloses a system for providing the automated electronic validation of industrial process code for an industrial control environment. Components of a system that facilitate such validation can include a monitoring component that tracks execution of code in an industrial control, and a storage component that receives a result of the execution of the code and stores the result in memory. Each line or logical element of code can be analyzed in this manner to determine a percentage of code that executes successfully and a percentage that does not, for instance.
- European Publication No. EP2447844 (Conan et al.) discloses an HMI comprising: a data input for receiving input data comprising information to be indicated by the HMI; an indication device; a first processor connected to the data input for receiving the input data; a first program implementing a first predetermined procedure for producing indication data which unambiguously define the way an indication device of the HMI will indicate the information, wherein the first processor is adapted to perform the first program; a modification device adapted to modify the indication data for the purpose of validating the correct operation of the HMI and obtaining modified indication data; a second processor also connected to the data input for receiving the input data and is connected to an output of the first processor and to an output of the modification device for receiving the modified indication data.

There is a need for a human-machine interface test system involving the automated audio input and output analysis and generation, visual verification of a display screen with graphics and texts display, including touch interface control and feedback, external device (smart phone, tablet, laptop, etc.) interface, as well as data logging for communication between the HMI device and the rest of the system, whether it be an automobile, airplane, truck, earth moving equipment, consumer electronic device, or some other machine or device, an automated test system is needed that will replace the testing and validation that previously had required human interaction.

There is a need for a human-machine interface test system that will enable automated testing and validation of the machine (e.g. -vehicle) interfaces which use audio, visual, touch, motion, wired (hard-buttons), wireless (e.g. -Bluetooth, Near Field Communication, WiFi, etc.), communication bus for input and output and which will provide more accurate and reliable results, increased repeatability and consistency in a controlled environment while significantly decreasing test time in order to make the system more robust and improve quality.

There is a need for a human-machine interface test system that will provide more accurate and reliable results from the conducted tests, increasing repeatability and consistency in a controlled environment, while significantly decreasing test time.

SUMMARY OF THE INVENTION

The human-machine interface test system of the present invention addresses the above needs.

The human-machine interface test system of the present invention combines multiple technologies to achieve complete test automation of a complex HMI. The human-machine interface test system of the present invention is capable of automated audio input/output analysis/generation, visual detection of a display screen, touch interface control and feedback, wired or wireless external device control input to the HMI device (smart phone, tablet, etc. interfacing to the HMI device), as well as data logging for communication between the HMI and the rest of the system, automobile, airplane, truck, consumer electrical devices, earth moving equipment, machines, and other devices. The use of all of these elements enables full test automation of human-machine interfaces that previously had required human interaction to test and validate.

In this specification the human-machine interface test system of the present invention is discussed mainly in relation to a vehicle (cars, buses, trucks, tractors, earth moving equipment, vans, RVs, boats, yachts, planes and light aircraft, and the like) only for purposes of illustration only, it is specifically understood that those having ordinary skill in the art will readily recognize that the principles of the present invention can be readily applied to broad range of other vehicular applications, including, but not limited to machine interfaces, head unit, instrumentation, head units, instrumentation, heads up display, chimes and enunciators, and a broad range of consumer devices including cell phones, televisions, tablet computers, e-readers, appliance interfaces, and alarm system interfaces.

For a more complete understanding of the human-machine interface test system of the present invention, reference is made to the subsequent detailed description and examples with references made to the accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

DETAILED DESCRIPTION OF THE PREFERRED EMBODIMENTS

Figure 1:
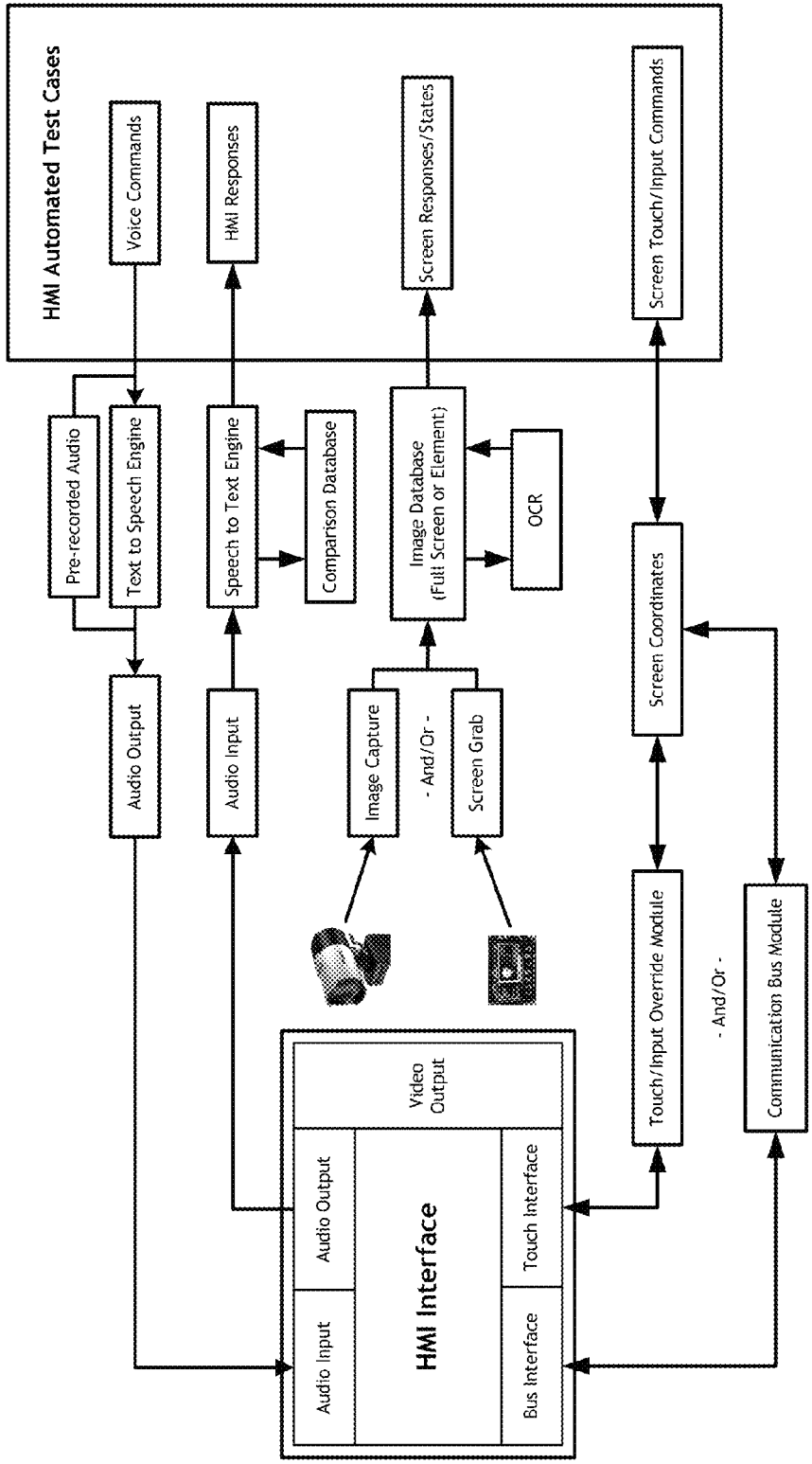
FIG. 1 discloses a diagram of the preferred embodiment of the human-machine interface test system of the present invention, including the HMI object being tested, and the relationship of said object being tested to the HMI input control system, the HMI output processing system, and the HMI main control system.

Referring now to the drawings, FIG. 1 discloses a diagram of the preferred embodiment of the human-machine interface test system of the present invention [10], including the HMI object being tested [50], and the relationship of said HMI object being tested (which is also referred to as the "device under test") to the HMI input control system [20], the HMI output processing system [30], and the HMI main control system [40]. FIG. 1 depicts the function of the system controller and how the system interfaces with the HMI display. The HMI input controls system [20] includes the following components: (1) HMI input controls (voice commands [21], touch display and screen commands [22], motion commands [23], hard button/switch commands [24], and external device control [25]); (2) HMI output processing system [30] includes voice or other audio [31], text [32], pictures and graphics [33], and indicators [34]. The HMI main control system [40] includes HMI input controls [41], HMI output analysis [42], data logging and analysis [43], a decision engine which is preferably pass/fail [44], and a test and script engine [45]. The system controller also tests the HMI input controls: voice commands [21], touch display/screen commands [22], motion commands [23], hard button/switch commands [24] and runs them through the testing protocol that is user defined. These functions are all tested with the pass/fail decision engine [45] passing or failing each function (based on a predefined criteria set up by the user of the human-machine interface test system) and the data logger component [43] of the human-machine interface test system is logging all inputs and outputs of the system (including video captures) for further post analysis of instances of a pass/fail.

Figure 2:
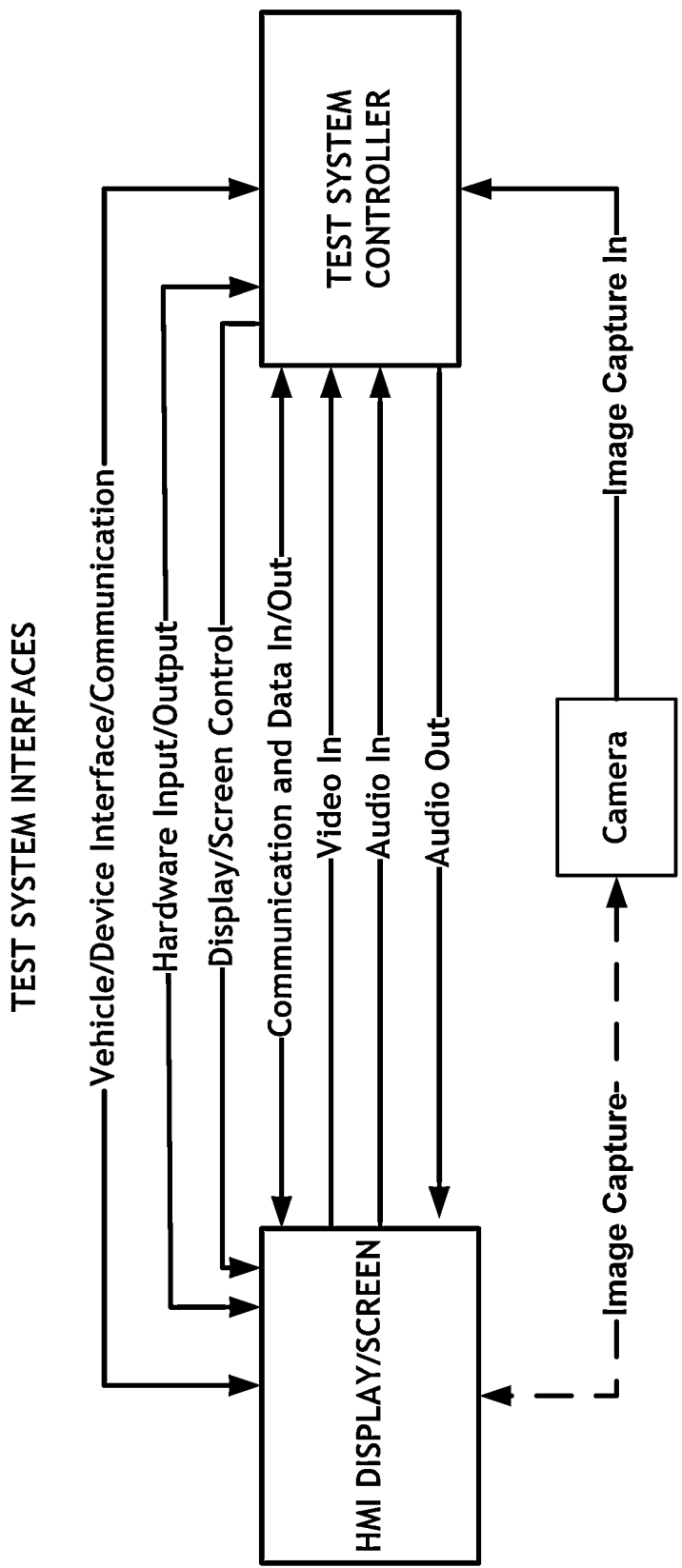
FIG. 2 discloses a simplified block diagram of a high level HMI test strategy for the HMI object being tested and the human-machine interface test system of the present invention, according to the preferred embodiment of FIG. 1.

FIG. 2 discloses a simplified block diagram of a preferred embodiment of high level HMI test strategy for the HMI object being tested [50] and the human-machine interface test system [10] of FIG. 1. The HMI audio input module [51] receives audio output [52] from the automated test cases (computer controlled test or system manager) which comprise voice commands [61] based on pre-recorded audio files [79] (that may be in any language) as well as text files that will use the Text-to-Speech Engine [80] of the human-machine interface test system [10] in order to convert to audio. Such input to the HMI device is achieved either via a wired or wireless (audio or digital signal). The human-machine interface test system audio output module [52] transmits outputs through the audio (wired or wireless (audio or digital)) and uses the Speech-to-Text Engine [81] of the human-machine interface test system [10] to convert the output of the HMI [50] into a recognizable and analyzable signal for the human-machine interface test system [10] of the present invention. The responses of the HMI [50] are recorded for subsequent analysis against pass/fail criteria. The HMI video (display) output module [52] of the device that the HMI is being tested for uses either an image capture or a screen capture which is then transmitted to the screen databases and then onto the screen responses/states for proper analysis against a predefined pass/fail criteria. The External Device Control module [65] of the human-machine interface test system [10] enables the control of (consumer) devices that are wired or wirelessly connected to the HMI device (smart phone, tablet, etc.) enabling the use of the other human-machine interface test system feedback or monitoring features to verify the proper HMI behavior based on such external device inputs [85]. The HMI touch interface module [54] is transmitted through the touch/input override module [72] and/or the human-machine interface test system bus interface module [55] is transmitted through the communication bus [73] or a device debugging port, both controlling and manipulating the screen touch/input commands [64].

Figure 3:
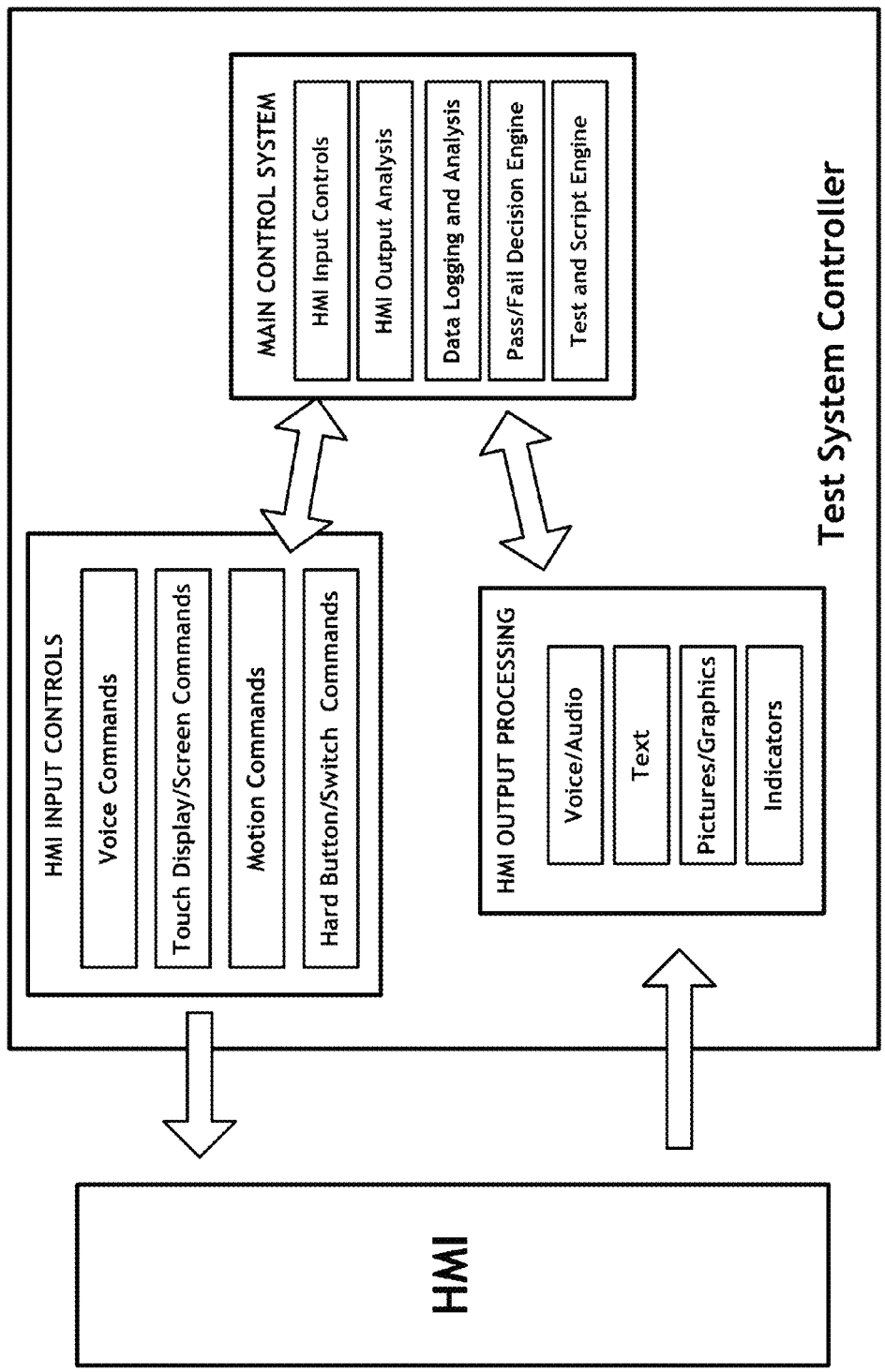
FIG. 3 discloses a simplified block diagram of depicting HMI test system interfaces for the HMI object being tested and the human-machine interface test system, according to the preferred embodiment of FIG. 1.

The human-machine interface test system of the present invention provides:

A system for HMI and radio/head unit (cluster, center-stack, etc.) interface testing Functional, performance and continuous monitoring Repetitive testing in a controlled environment Regression and stress testing Customer or Supplier setup and execution test cases FIG. 3 discloses a simplified block diagram of a preferred embodiment depicting HMI test system interfaces for the HMI object being tested and the human-machine interface test system of FIG. 1. FIG. 3 depicts the test system interface of the human-machine interface test system in which comprises the HMI display screen, test system controller external device controller [92] and camera [91] (graphical HMI output capture device) with the interfaces being used to stimulate/control the HMI or testing the HMI output/responses comprising: audio out, audio in, video out, video in, communication and data in/out; display/screen control (touch-screen, gesture, and/or button push inputs), hardware input/output, vehicle/device interface/communication, external device input, image capture. Audio in, and video in, data flows from the HMI display screen to the system controller for testing and validation (against a predefined pass/fail criteria), while the audio/video out data flows from the system controller to the HMI display screen with communication and data in/out, hardware input/output, and vehicle/device interface/communication data flowing back and forth between the HMI display screen and the test system controller and the image data from the camera [91] being sent directly to the test system controller and, simultaneously, being sent to the HMI display screen. The test system controller logs all relevant data for further analysis of any anomalies or system behaviors detected during testing. The present invention does not require any software to reside on the HMI device under test [50] and therefore the human-machine interface test system [10] is HMI device operating system (OS) agnostic. This is one of several critical and unique advantages of this invention as the HMI devices under test [50] are not changed or impacted by new, additional test software that may negatively or adversely affects the behavior of the HMI.

The human-machine interface test system of the present invention [10] automates and tests mobile apps in a closed loop, end-to-end system.

The system of the present invention has harnessed the same technologies for the infotainment system, and they have been leveraged into Android, iOS, and others.

Provides full extension of all user inputs

Provides end to end automated testing from the customer's fingertips, to the infotainment/telematics module and back.

Enables testing of Bluetooth®, Mobile Apps, and Smartphone Integration into the Vehicle.

The HMI test system [10] mimics a user's speech and touch, and then validates the response of voice, display, and behavior of the infotainment system. The preferred embodiment of the HMI test system of the present invention [10] is preferably fully automated via the easy-to-use graphical user interface or GUI and standardized test script builder supplied by NI TestStand.

The parts of the invention comprise the following: audio output [52], text-to-speech engine [80], pre-recorded playback of audio elements [79], audio input [51], speech-to-text engine [81], waveform comparison with pre-recorded audio elements, visual input, screen capture pixel comparison, image-to-text, touch input, software feedback from device, communications feedback from device, direct hardware feedback from device, touch output, software input to device, communications input to device, direct hardware input to device, test script execution, user configurable test scripts to call each of the above functions, motion output comprising of hand or eye or head or trigger-based devices, pre-recorded playback of motion elements, external device (smart phone tablet, etc.) input commands, communication bus [73], rest bus simulation for allowing HMI device to operate in test environment as it would in real environment (vehicle, machine, airplane, etc.), input of commands to HMI device for control, data logging on a communication bus.

The human-machine interface test system of the present invention [10] is used for development and automated testing of devices containing one or any combination of the following input or output methods: audio, visual, touch, motion, communication bus while more accurate and reliable results are thus gained from conducted test with increased repeatability and consistency in a controlled environment and a significant decrease in test time. Testing may also be performed using speakers and microphone input and output components on the HMI device as well as the human-machine interface test system side instead of having input/output signals going through physical wires. The human-machine interface test system may use noise cancellation technology for both the wireless or wired test application/setup depending on the need for it to assure that the input/output signals are not negatively or adversely affected by the test setup or test environment that would then lead to faulty test results.

Ideal applications for the human-machine interface test system of the present invention automation testing include:
    Voice Recognition Tree Flows Verification
    Voice Recognition Performance Testing
    Screen Flows/Wireframes Verification
    Regression Testing
    Stress Testing
    Performance and Reliability Testing
    System Monitoring
    End-to-End Testing with Mobile Apps, and Customer Portals Tracking the eye gaze of the driver of a vehicle provides an HMI with useful information as to the state of alertness of the operator and can be a useful tool in avoiding hazardous conditions for the operator and the vehicle. The error-free detection and tracking of eyes, eye positions or pupils is an important human-machine-interface.

Also, in viewing a display (computer) screen, a monitoring of the viewer's eyes when they have reached the bottom of a page, can be used to scroll to the next screen. Hand gestures of the viewer are also sensed. Similarly, when the viewer looks away from the screen for significant periods of time, the screen can revert into a screen saver mode. Such applications of eye detection technology as an input to a device's HMI are used by the human-machine interface test system of the present invention [10]. It is either simulated by the human-machine interface test system as an input to the device's HMI or recreated by means of a prerecorded (video) input. As with any other inputs created by the human-machine interface test system [10] to the HMI device under test [50], the human-machine interface test system [10] is subsequently analyzing the test and validate the proper behavior of the HMI device [50] based on such input.

Fully automated touch input. The human-machine interface test system of the present invention [10] has incorporated the ability to make a direct link into the HMI unit under test [50] with the touch interface [54]. Previous systems have relied on expensive mechanical fixtures or non-automated human intervention to complete the touch interface tasks. The unique methodology of the human-machine interface test system of the present invention [10] provides direct access to the unit under test touch interface [54] via its communication bus by replicating the unit under test touch screen component protocol. This method enables not only the transmission of touch/swipe coordinate information to the HMI unit being tested [50], the method also provides access to physical coordinates when the touch screen is operated by a human.

The human-machine interface test system of the present invention [10] provides a solution for automating spoken commands and grants to the user the ability to either generate speech commands using a text-to-speech engine [80], or select a pre-recorded command [79] from a database.

Detecting the audio feedback from the unit under test [50] is accomplished by processing the audio through the speech-to-text engine [81], and comparing the output against a known response text library. Alternatively, the human-machine interface test system of the present invention [10] compares the audio response(s) against a pre-recorded response(s).

The visual solution overcomes sensitivity to minute optical related environmental changes of previous attempts with this type of system. These items include lighting, contrast, and brightness levels, as well as the camera position and angle relative to the unit under test. Calibration routines are created that provide multiple HMI test systems with the ability to use the same base image library for comparison. The calibration routines also correlate the touch screen coordinates to the visual feedback from a human-machine interface test system camera.

A major challenge in designing the human-machine interface test system of the present invention was in creating a faster, more reliable, and less expensive way to test and validate the human machine interface of telematics and infotainment control modules or any other control module with a display such as, but not limited to, a cluster display in a vehicle.

The preferred embodiment of the human-machine interface test system of the present invention [10] utilizes National Instruments Test Stand, LabVIEW, and Vision Toolbox to develop an automated test system that incorporates text-to-speech, speech-to-text, vehicle networking, video imaging, and touch screen interactions.

The human-machine interface test system of the present invention [10] automates the tedious task of validating user interfaces containing speech, video, touch, internet, and smart-phone technologies typically found in vehicle audio head units and other multimedia devices. The human-machine interface test system of the present invention [10] is capable of testing each of those interfaces individually, or combined to verify an entire system. Different configurations can be readily designed for specific applications by using National Instruments software in combination with imaging, voice recognition, vehicle networking, and other technologies. The human-machine interface test system of the present invention [10] validates all of the user interaction functionality of a modern telematics or infotainment device, as well as other consumer devices (such as iPads, tablets, and smart phones).

The preferred embodiment of the human-machine interface test system of the present invention [10] programmatically interacts with the target device [50] using pre-recorded audio [79], speech-to-text [81], text-to-speech [80], video, and touch screen interfaces [54]. For each test case defined in Test Stand, conditions and stimuli are set to prompt the required device under test behavior. Each code module defined in Test Stand executes a test on the target device and returns measurement information. CAN bus simulation may be included to provide ignition, wakeup and other signals that the device under test would receive in a target vehicle and for feedback from the device under test.

The human-machine interface test system of the present invention [10] has the ability to force touch screen inputs in order to simulate user interaction with the HMI of the device under test. The system also utilizes text-to-speech in order to send voice commands and speech-to-text to verify the behavior of the device under test [50]. The interface is automated, so tests can be repeated to accurately define the confidence of each of these inputs.

The preferred embodiment of the human-machine interface test system of the present invention [10] employs National Instruments Test Stand as the main test management and execution interface. Tests are defined in the Sequence Editor that executes code modules written in NI LabVIEW or any programming language. NI Vision Toolbox is used to assess device under test feedback via video imaging from a HD video camera or the device under test video output.

Accordingly, the HMI feedback is assessed using NI Vision Toolbox and video capture, speech to text, CAN bus signals and other means systematically, in a controlled test environment. Feedback data is also gathered and processed using LabVIEW code modules. Stimuli, feedback and Pass/Fail results are logged and reported via Test Stand.

HMI testing has typically been done manually by human resources over a long period of time. By using National Instruments Test Stand, LabVIEW, and Vision Toolbox, the human-machine interface test system of the present invention [10] was quickly developed and brought to market. The human-machine interface test system of the present invention [10] reduces test time by 67% while increasing reliability.

The human-machine interface test system of the present invention [10] is essential whenever there is a need for a reliable, consistent, and cost effective solution to stress test and validate an HMI [50]. The majority of customer complaints on a telematics or infotainment device are HMI related.

The human-machine interface test system of the present invention sets users apart from their competition, since the human-machine interface test system of the present invention includes the following features:

Fully automated—runs test scripts
Ability to run on simulated hardware—actual device is not required
Button press/touch screen interaction signals are injected
Multi-lingual—use of pre-recorded audio commands enables custom libraries for languages not covered by text to speech engines
HD camera interface, or screen capture
Full logging and test reports that include audio and visual captures of the device output when errors are detected
Logs vehicle/system bus communications for complete issues capture capability
Head Unit OS (or any device under test OS)—Independent Applications for the HMIts of the present invention [10] include:
Voice Recognition Tree Flows Verification
Voice Recognition Performance Testing
Screen Flows/Wireframes Verification
Regression Testing
Stress Testing
Performance and Reliability Testing
System Monitoring
End-to-End Testing with Mobile Applications, and Customer Portals Throughout this specification, there are various Patent/Applications that are referenced by application number and inventor. The disclosures of these Patents and Applications are hereby incorporated by reference in their entireties into this specification in order to more fully describe the state-of-the-art.

It is evident that many alternatives, modifications, and variations of the present invention and any others disclosed herein of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST

10—human-machine interface test system
20—HMI Input Control System

21—Voice Commands
22—Touch Display/Screen Commands
23—Motion Commands
24—Hard Button/Switch Commands
25—External Device Control
30—HMI Output Processing System
31—Voice/Audio
32—Text
33—Pictures/Graphics
34—Indicators
40—HMI Main Control System
41—HMI Input Commands
42—HMI Output Analysis
43—Data Logging and Analysis
44—Pass/Fail Decision Engine
45—Test and Script Engine
50—HMI Object Being Tested
60—HMI Automated Test Cases
61—Voice Commands
62—HMI Responses
63—Screen Responses/States
64—External Device Control
65—External Device Control
72—Touch/Input Override Module
73—Communication Bus Module
74—Screen Coordinates
75—Audio Output
76—Audio Input
77—Image Capture
78—Screen Grab
79—Pre-recorded Audio
80—Text-to-Speech Engine
81—Comparison Database
82—Image Database
83—External Device Output
84—Optical Character Recognition (OCR)
85—External Device Output
91—Interface Camera
92—Interface External Device Control

The invention claimed is:

1. A human-machine interface test system, comprising:
   a. an HMI input control system for sending input data to an HMI device being tested, said input data being sent via a wired or wireless connection;
   b. an HMI output processing system for receiving output data from said HMI device being tested, said output data being transmitted via a wired or wireless connection; and
   c. an HMI main control system controlling said input data, said HMI main control system receiving a transmitted signal of converted output data from said HMI output processing system, said HMI main control system logging and analyzing said output data received from said HMI output processing system, said HMI main control system storing and running test scripts used for testing said HMI device being tested;
   wherein an external device control module enables said human-machine interface test system to control an intermediate device, said intermediate device selected from the group consisting of a pocket computer, a handheld computer, a palm-type computer, a tablet computer, a smart phone, and a pen-based based computer.

2. A human-machine interface test system, comprising:
   a. an HMI input control system for sending input data to an HMI device being tested, said input data being sent via a wired or wireless connection;
   b. an HMI output processing system for receiving output data from said HMI device being tested, said output data being transmitted via a wired or wireless connection; and
   c. an HMI main control system controlling said input data, said HMI main control system receiving a transmitted signal of converted output data from said HMI output processing system, said HMI main control system logging and analyzing said output data received from said HMI output processing system, said HMI main control system storing and running test scripts used for testing said HMI device being tested;
   wherein video output of said HMI device being tested is captured by an image or screen capture device.

3. A human-machine interface test system, comprising:
   a. an HMI input control system for sending input data to an HMI device being tested, said input data being sent via a wired or wireless connection;
   b. an HMI output processing system for receiving output data from said HMI device being tested, said output data being transmitted via a wired or wireless connection; and
   c. an HMI main control system controlling said input data, said HMI main control system receiving a transmitted signal of converted output data from said HMI output processing system, said HMI main control system logging and analyzing said output data received from said HMI output processing system, said HMI main control system storing and running test scripts used for testing said HMI device being tested;
   wherein said input data comprises voice data stored as pre-recorded audio files or text files in said HMI input control system, said text files being convertible to audio files via a text-to-speech engine in said HMI input control system.

4. A human-machine interface test system, comprising:
   a. an HMI input control system for sending input data to an HMI device being tested, said input data being sent via a wired or wireless connection;
   b. an HMI output processing system for receiving output data from said HMI device being tested, said output data being transmitted via a wired or wireless connection; and
   c. an HMI main control system controlling said input data, said HMI main control system receiving a transmitted signal of converted output data from said HMI output processing system, said HMI main control system logging and analyzing said output data received from said HMI output processing system, said HMI main control system storing and running test scripts used for testing said HMI device being tested;
   wherein said output data comprises audio output, said audio output being convertible to text via a speech-to-text engine in said HMI output processing system.

5. A human-machine interface test system, comprising:
   a. an HMI input control system for sending input data to an HMI device being tested, said input data being sent via a wired or wireless connection;
   b. an HMI output processing system for receiving output data from said HMI device being tested, said output data being transmitted via a wired or wireless connection; and
   c. an HMI main control system controlling said input data, said HMI main control system receiving a transmitted signal of converted output data from said HMI output processing system, said HMI main control system logging and analyzing said output data received from said HMI output processing system, said HMI main control system storing and running test scripts used for testing said HMI device being tested;

wherein said human-machine interface test system is digitally connected to said HMI device being tested via a touch/input override module or a communication bus module, said touch/input override module or said communication bus module being used to control the screen touch/input data of said HMI device being tested.

6. A human-machine interface test system, comprising:

a. an HMI input control system for sending input data to an HMI device being tested, said input data being sent via a wired or wireless connection;

b. an HMI output processing system for receiving output data from said HMI device being tested, said output data being transmitted via a wired or wireless connection; and c. an HMI main control system controlling said input data, said HMI main control system receiving a transmitted signal of converted output data from said HMI output processing system, said HMI main control system logging and analyzing said output data received from said HMI output processing system against predefined criteria predetermined by system user;

wherein an external device control module enables said human-machine interface test system to control an intermediate device, said intermediate device selected from the group consisting of a pocket computer, a handheld computer, a palm-type computer, a tablet computer, a smart phone, and a pen-based based computer.

7. A human-machine interface test system, comprising:

a. an HMI input control system for sending input data to an HMI device being tested, said input data being sent via a wired or wireless connection;

b. an HMI output processing system for receiving output data from said HMI device being tested, said output data being transmitted via a wired or wireless connection; and c. an HMI main control system controlling said input data, said HMI main control system receiving a transmitted signal of converted output data from said HMI output processing system, said HMI main control system logging and analyzing said output data received from said HMI output processing system against predefined criteria predetermined by system user;

wherein video output of said HMI device being tested is captured by an image or screen capture device.

8. A human-machine interface test system, comprising:

a. an HMI input control system for sending input data to an HMI device being tested, said input data being sent via a wired or wireless connection;

b. an HMI output processing system for receiving output data from said HMI device being tested, said output data being transmitted via a wired or wireless connection; and c. an HMI main control system controlling said input data, said HMI main control system receiving a transmitted signal of converted output data from said HMI output processing system, said HMI main control system logging and analyzing said output data received from said HMI output processing system against predefined criteria predetermined by system user;

wherein said input data comprises voice data stored as pre-recorded audio files or text files in said HMI input control system, said text files being convertible to audio files via a text-to-speech engine in said HMI input control system.

9. A human-machine interface test system, comprising:

a. an HMI input control system for sending input data to an HMI device being tested, said input data being sent via a wired or wireless connection;

b. an HMI output processing system for receiving output data from said HMI device being tested, said output data being transmitted via a wired or wireless connection; and c. an HMI main control system controlling said input data, said HMI main control system receiving a transmitted signal of converted output data from said HMI output processing system, said HMI main control system logging and analyzing said output data received from said HMI output processing system against predefined criteria predetermined by system user;

wherein said output data comprises audio output, said audio output being convertible to text via a speech-to-text engine in said HMI output processing system.

10. A human-machine interface test system, comprising:

a. an HMI input control system for sending input data to an HMI device being tested, said input data being sent via a wired or wireless connection;

b. an HMI output processing system for receiving output data from said HMI device being tested, said output data being transmitted via a wired or wireless connection; and c. an HMI main control system controlling said input data, said HMI main control system receiving a transmitted signal of converted output data from said HMI output processing system, said HMI main control system logging and analyzing said output data received from said HMI output processing system against predefined criteria predetermined by system user;

wherein said human-machine interface test system is digitally connected to said HMI device being tested via a touch/input override module or a communication bus module, said touch/input override module or said communication bus module being used to control the screen touch/input data of said HMI device being tested.

* * * * *